Patented Oct. 4, 1932

1,880,837

UNITED STATES PATENT OFFICE

MICHAEL CUDAHY, OF MILWAUKEE, WISCONSIN, ASSIGNOR TO CUDAHY BROTHERS CO., OF CUDAHY, WISCONSIN, A CORPORATION OF WISCONSIN

MEAT PRODUCT AND PROCESS OF PRODUCING THE SAME

No Drawing.   Application filed March 18, 1929.   Serial No. 348,134.

The invention relates to sterilized meat products and process of producing the same.

The object of the invention is to provide a meat product that will keep for long periods of time under ordinary climatic conditions so that it may be shipped to foreign countries without deteriorating and will retain the original meat juices and the flavor imparted to it by the addition of wines or other liquid flavorings, which has not been heretofore possible under known methods of rendering meat products permanently keeping. The new hermetically sealed, preserved and flavored meat product is produced by the novel process hereinafter described.

The invention will be particularly described in connection with the treatment of hams but this is only by way of illustration as the invention is equally applicable to other meats and in the following specification the word "ham" is to be read as including other joints or sections of meat.

In the carrying out of the invention the hams are boned and fatted down to about one quarter and not over one-half inch layer of fat and the skin removed. As thus prepared they are cured and salted in known manner and after about twelve days of curing they are ready for processing.

The cured hams are soaked for about one hour in water at about 70 degrees Fahrenheit and are then smoked in the usual manner for from twelve to fourteen hours after being put in a stockinet. The smoked, boned hams are then placed in moulds substantially the same shape of the cans in which the hams are to be preserved and are pressed in these moulds for about two hours or until they acquire the desired shape. During this time the hams are cooled and on their removal from the moulds are flavored with the desired flavoring medium. In the case of ham, I prefer to use champagne for imparting the desired flavor thereto and with other meats I may use other wines, such as sherry, sauterne or other suitable flavoring ingredients. These flavoring mediums in their natural state are in the form of liquids and as they would be practically lost in subsequent steps of the process these liquid flavoring mediums are incorporated in an edible medium capable of congealing when subjected to a reduced temperature, preferably a thick, heavy syrup that may be made from brown sugar or other suitable syrup material.

According to the present invention the cold, shaped hams are coated with this thick syrup containing the liquid flavoring medium and because of the difference in temperature between the coating material and the ham this coating congeals on the ham.

The coating is preferably applied by dipping the hams into the thick syrup containing the flavoring, which syrup has been heated to a temperature which permits it to flow to produce a coating.

The ham thus shaped and wholly or partly covered with the congealed coating containing the flavoring is then placed in a can of substantially the same shape as the ham, said can having walls capable of yielding to take care of the subsequent heating and cooling steps. The filled cans are topped and soldered and a vent opening left in the side or top and then placed in a vacuum chamber and given about twenty-six inches of vacuum, whereby the air is drawn out from the inside of the can through the vent opening. While the can is still in said vacuum chamber the vent opening is closed off, thus providing an hermetically sealed container, it being noted that since the flavoring is incorporated in the congealed medium it will be retained therein even though the vacuum draws off any liquids present in the can.

The hermetically sealed, filled containers are then subjected to the usual cooking and sterilizing process. As an example, the cans are kept in water at about 180 degrees Fahrenheit for one hour and then at 170 degrees Fahrenheit for the remaining period, which depends upon the size of the can. The cooked hams are then cooled in the can with cold water immediately after the cooking is finished and the cans are then labelled or otherwise finished for merchandising.

During the cooking process the congealed coating is converted into syrup and the liquid flavoring medium is free to mix with the juices from the meat given off within the can during the cooking so that all the original flavor of the meat and the flavoring medium is retained with the meat within the can so that a very appetizing and superior product is produced, ready for consumption when the can is opened.

What I claim as my invention is:

1. The method of preserving meat which consists in preparing the meat for insertion into a can of about the same cubical content of the meat, cooling the meat and while in a cool condition applying a congealable coating thereto including a liquid flavoring medium, inserting the meat with the congealed coating thereon into the can provided with a vent, exhausting the air from the can through the vent, hermetically sealing the vent and subsequently processing the can to cook, sterilize and flavor the meat while hermetically inclosed within the can.

2. The method of preserving meat which consists in preparing the meat for insertion into a can of about the same cubical content as the meat, cooling the meat, and while in a cool condition applying a syrup thereto of a consistency to form a congealable coating and containing a liquid flavoring medium, allowing the syrup to congeal on the meat, inserting the meat with the congealed syrup thereon into a can provided with a vent, exhausting the air through the vent in the can, hermetically sealing the vent and subsequently processing the can to cook, sterilize and flavor the meat while hermetically inclosed within the can.

3. The method of preserving meat which consists in preparing the meat for insertion into a can of about the same cubical content as the meat and in a shape to fit the can, cooling the meat thus formed and while cold dipping the meat in a congealable, edible medium containing a liquid flavoring, allowing this medium to congeal on the meat and then inserting the same into a can, provided with a vent, of substantially the same size and shape as the meat, exhausting the air from the can through the vent, hermetically sealing the vent and subsequently processing the can to cook, sterilize and flavor the meat while hermetically inclosed within the can.

4. The method of preserving ham which consists in taking a boned, cured and smoked ham and pressing the same in a mould to approximately fit the shape of a can, cooling the ham while in the mould, removing the ham from the mould and applying a congealable coating thereto including a liquid flavoring medium, placing the ham thus prepared in the vented can for which it was shaped, exhausting the air from the can through the vent, hermetically sealing the vent and subsequently processing the can to cook, sterilize and flavor the meat while hermetically inclosed within the can.

In testimony whereof, I affix my signature.

MICHAEL CUDAHY.